US008950006B2

(12) United States Patent
Birman et al.

(10) Patent No.: US 8,950,006 B2
(45) Date of Patent: Feb. 3, 2015

(54) METHOD FOR ACCESS TO A PORTABLE MEMORY DATA SUPPORT WITH AUXILIARY MODULE AND PORTABLE MEMORY DATA SUPPORT

(75) Inventors: Boris Birman, Landshut (DE); Frank Götze, München (DE); Stephan Beinlich, München (DE); Elmar Stephan, Mairena del Alyarafe (ES); Fabian Guter, Feldkirchen (DE); Armin Bartsch, Landsberg am Lech (DE)

(73) Assignee: Giesecke & Devrient GmbH, Munich (DE)

(*) Notice: Subject to any disclaimer, the term of this patent is extended or adjusted under 35 U.S.C. 154(b) by 622 days.

(21) Appl. No.: 12/515,230
(22) PCT Filed: Nov. 15, 2007
(86) PCT No.: PCT/EP2007/009892
§ 371 (c)(1),
(2), (4) Date: Sep. 25, 2009
(87) PCT Pub. No.: WO2008/058741
PCT Pub. Date: May 22, 2008

(65) Prior Publication Data
US 2010/0049988 A1  Feb. 25, 2010

(30) Foreign Application Priority Data
Nov. 16, 2006 (DE) .......................... 10 2006 054 024
Oct. 19, 2007 (DE) .......................... 10 2007 050 463

(51) Int. Cl.
*G06F 21/24* (2006.01)
*G07F 7/10* (2006.01)
(Continued)

(52) U.S. Cl.
CPC .............. *G07F 7/1008* (2013.01); *G06F 21/62* (2013.01); *G06F 21/78* (2013.01); *G06Q 20/341* (2013.01); *G06Q 20/35765* (2013.01)
USPC .............. 726/30; 713/189; 711/100; 711/115

(58) Field of Classification Search
None
See application file for complete search history.

(56) References Cited

U.S. PATENT DOCUMENTS 5,491,827 A  2/1996  Holtey
5,754,817 A  5/1998  Wells
(Continued)

FOREIGN PATENT DOCUMENTS

DE  69522998 T2  6/2002
DE  69815258 T2  4/2004
(Continued)

OTHER PUBLICATIONS

V.A.: "Referenzparameter", Wikipedia, [Online] Oct. 20, 2005, XP002511685, Retrieved from the Internet: URL:http://de.wikipedia.org/w/index.php?title=Referenzparameter&oldid=22817024> [retrieved on Jan. 20, 2009] the whole document.
(Continued)

*Primary Examiner* — Jung Kim
*Assistant Examiner* — Robert Leung
(74) *Attorney, Agent, or Firm* — Workman Nydegger

(57) ABSTRACT

A method, a memory data carrier (30) as well as a terminal (10) are proposed for accessing a portable memory data carrier (30) having a standardized memory element (34) and an additional module (40). The method permits a data transmission selectively to the memory element (34) or to the additional module (40). According to the method application data intended for the additional module (40) are generated, routing information for the application data, with information about the application data, is generated and added to the application data (108), the resulting data stream is embedded in data blocks according to a transmission protocol adapted to the memory element (34) and transmitted, it is determined by the memory data carrier (30) whether a received data block contains routing information, and the data contained in the data block are routed to the additional module (40) if the data block contains routing information.

39 Claims, 5 Drawing Sheets

(51) Int. Cl.
*G06F 21/62* (2013.01)
*G06F 21/78* (2013.01)
*G06Q 20/34* (2012.01)

(56) References Cited

U.S. PATENT DOCUMENTS

| | | | |
|---|---|---|---|
| 6,317,755 B1* | 11/2001 | Rakers et al. | 1/1 |
| 6,415,350 B2* | 7/2002 | Asoh | 711/103 |
| 6,882,568 B2* | 4/2005 | Shiota et al. | 365/185.08 |
| 7,072,129 B1 | 7/2006 | Cullen | |
| 7,303,136 B2* | 12/2007 | Tsunoda et al. | 235/492 |
| 7,305,535 B2* | 12/2007 | Harari et al. | 711/164 |
| 2004/0034734 A1* | 2/2004 | Boyer | 711/103 |
| 2004/0210715 A1 | 10/2004 | Harari | |
| 2005/0053095 A1* | 3/2005 | Kato et al. | 370/474 |
| 2005/0138303 A1 | 6/2005 | Nagino | |
| 2005/0144417 A1* | 6/2005 | Sheriff et al. | 711/203 |
| 2006/0059548 A1* | 3/2006 | Hildre et al. | 726/9 |
| 2008/0244208 A1* | 10/2008 | Narendra et al. | 711/164 |

FOREIGN PATENT DOCUMENTS

| | | | |
|---|---|---|---|
| DE | 102004050039 A1 | 5/2005 | |
| EP | 0596276 B1 | 5/1999 | |
| EP | 0940767 A1 | 9/1999 | |
| EP | 1304702 A1 | 4/2003 | |
| EP | 1473664 A2 | 11/2004 | |
| EP | 1722305 A1 | 11/2006 | |
| WO | 2005026923 A1 | 3/2005 | |
| WO | 2006020152 A1 | 2/2006 | |
| WO | 2006090393 A2 | 8/2006 | |

OTHER PUBLICATIONS

Hüseyin Taskin: "Remote Procedure Call", Google Cache, [Online] Jan. 9, 1996, XP002511686 Università t Paderborn, Retrieved from the Internet: URL:http://74.125.77.132/search?q=cache:A9DciJ1pM6gJ: wwwcs.uni-paderborn.de/cs/heiss/lehre/ws95/projektgruppe/rpc.ps.gz+rpc+%22call+by+reference%22&hl=de&ct=clnk&cd=10&gl=de> [retrieved on Jan. 20, 2009] the whole document.

K. Geihs, G. Mühl: "Verteilte Systeme—Architekturen und Dienste" Vorlesung, [Online] 2004, XP002511687 TU Berlin, Retrieved from the Internet: URL:http://kbs.cs.tu-berlin.de/ivs/Lehre/SS04/VSAD/04.pdf> [retrieved on Jan. 20, 2009] abstract.

International Search Report in PCT/EP2007/009892, Feb. 17, 2009.

* cited by examiner

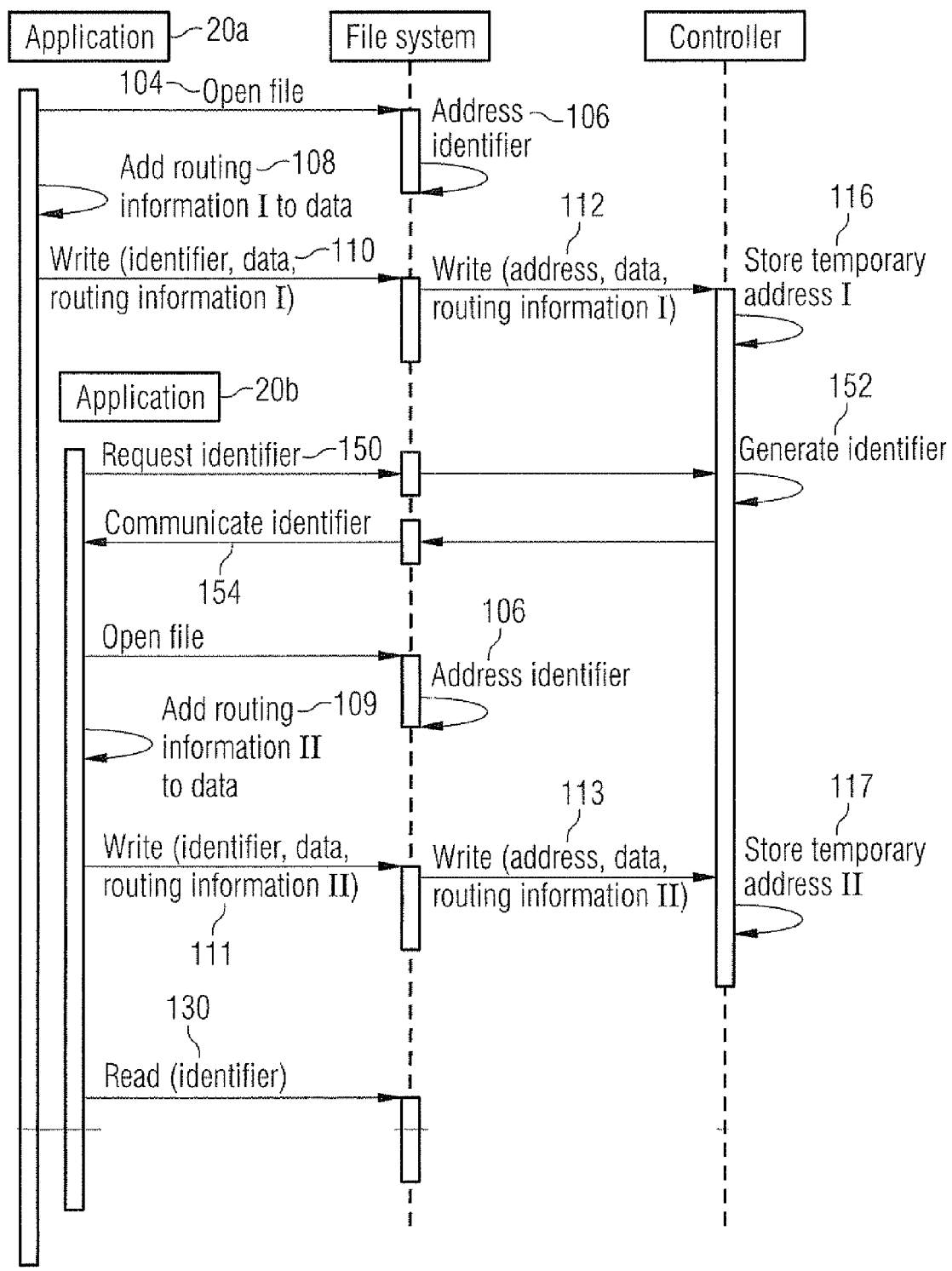

METHOD FOR ACCESS TO A PORTABLE MEMORY DATA SUPPORT WITH AUXILIARY MODULE AND PORTABLE MEMORY DATA SUPPORT

FIELD OF THE INVENTION

The invention relates to a method for accessing a portable memory data carrier with a memory element and at least one additional module, a portable memory data carrier as well as a terminal. In particular it relates to a mass memory card with a smart-card IC.

BACKGROUND

Portable mass memories with constantly expanding memory capacity are used increasingly more frequently in very diverse electronic devices. They can store digital contents or text data, image data, audio data or video data or the like. Portable mass memories have the advantage that they can be read and, if applicable, written by different electronic devices such as PCs, PDAs, smart phones, digital cameras, audio devices, etc. The portable mass memories thus permit an easy securing and transporting of digital contents.

For portable mass memories various standards have been developed, whose degree of acceptance varies. Some widespread types of mass memories are multimedia cards (MMC), secure digital memory cards (SD cards), micro-SD cards, memory sticks (USB sticks), but also CDs, DVDs, etc.

It has also already been known to equip portable data carriers of the above-mentioned type additionally with additional functions, particularly security functions, for example in order to protect certain digital contents of the memory against unauthorized access. WO 2006/090393 A2 discloses a method for access by a computer to a peripheral device connected with the computer via a standardized interface. The peripheral device can in particular be a mass memory unit that is connected with the computer via a USB interface and has an additional function, such as an authentication function. For security reasons the usability of operating system functions is limited in principle when accessing the mass memory unit. In order to enable a computer nevertheless to use the otherwise locked operating system functions during a data exchange with a mass memory unit, it is suggested to code corresponding commands in standard-command sequences which do not make any technical sense, but which are recognized and executed by a special application on the mass memory unit. The use of the method requires that suitable unused standard commands exist and that it is not intended to assign a technical effect to the commands used in the method in the long run either. The first is not always given; the second can be a handicap regarding further developments.

From DE 698 15 258 programmable, erasable and non-volatile memories are known that have a read- and/or write-protectable zone, wherein an absolutely determined, memory-independent boundary address delimits the write-protectable zone against the rest of the memory space, and it can be selected on which side of the boundary address the write-protectable zone is to be located. Additionally a protection word can be written in a protection register in order to define the location and size of the write-protectable zone. From EP 1 304 702 furthermore a portable semiconductor memory card and a data reading device in an electronic apparatus are known, by means of which digital contents can be protected. The memory card comprises a re-writable, non-volatile memory with an authentication area and an area not to be authenticated. The memory card additionally comprises a control circuit with a control unit for the area not to be authenticated and an authentication unit executing an authentication process to check whether the electronic apparatus is authorized to access the authentication area via an access control. In doing so the electronic apparatus communicates in an encrypted fashion and the access control decides after decrypting the commands whether the protected area is accessed. These known solutions have the disadvantage that respectively special drivers are required to access a memory card. However, setting up special drivers is work-intensive and impractical, since for different devices with different operating systems respectively particular drivers have to be developed and implemented.

From the "Handbuch für Chipkarten" [Chip-Card Handbook], W. Rankl, W. Effing, $4^{th}$ edition, Hanser Verlag, Munich, the function and application of smart-card ICs can be gathered. Among other things it contains descriptions of techniques of data transmission to a smart-card IC and methods for memory management.

SUMMARY

It is the object of the invention to provide a method for communication between a terminal and a portable memory data carrier with a main function and at least one additional function, which permits to selectively activate the main function or the additional function of the portable data carrier, without having to develop and set up respectively special drivers for this purpose. It is furthermore an object of the invention to provide a portable memory data carrier suitable to carry out the method, as well as a corresponding terminal.

The object is solved by a method having the features of the main claim. It is furthermore solved by a portable memory data carrier the claims as well as a terminal according to the claims.

The inventive method has the advantage that it can be used in systems with highly diverse memory data carriers without having to provide respectively new drivers. Rather, any given standard drivers or standard components can be used. This is achieved in that the data sent from a terminal to the additional module on a data carrier are respectively preceded by routing information, by means of whose presence the memory data carrier can decide whether data are intended for the memory element or the additional module. The routing information is generated directly by an application or by a driver element complementing a given standard driver.

According to the invention routing information contains an identifier that is unique for an additional module and is present preferably in the form of a character string of a predetermined length. In an expedient further development the routing information contains further information about sender and destination unit of application data.

Advantageously the accesses to the memory element take place by means of standard commands of the used operating system, in particular conventional write- and read commands, search commands, identification commands, etc.

In an advantageous further development of the inventive method the return transmission of responses from the additional module to the terminal takes place with the aid of a temporary working address in the memory element, at which the response is provided in the memory data carrier.

It is a general advantage of the inventive method that the changes required for its realization can be carried out without much effort.

An inventive portable memory data carrier can have the form and functionality of a conventional portable mass memory medium, such as a multimedia card (MMC), an SD memory card, a micro SD, a compact flash card or also of a memory stick or USB stick.

The memory element can be a non-volatile memory, for example a conventional flash memory, such as is used in mass memory cards. Likewise different memory element types are within the scope of this invention, such as RAM or ROM memory elements or miniaturized hard disks.

In a preferred embodiment the additional module or the security module comprises a smart-card IC with separate controller. This can be a conventional smart-card IC or a chip that is specially constructed for or adapted to the inventive application.

The controller evaluates all or parts of the data sent to the memory data carrier and checks whether the data contain routing information. In case of affirmation the controller routes the data to the additional module. Otherwise it executes a routine access to the memory element.

In a preferred embodiment it is provided to route an access to the additional module in an unchanged fashion, without modifying the application data.

Alternatively the function of the controller can also consist in that a certain procedure is carried out on received application data and the access is passed on to the additional module in a changed fashion, for example via instructions generated by the controller. The procedure to be carried out can be dependent on the type of access, in particular an access command itself or its parameters, so that through different commands and/or parameters a plurality of procedures can be carried out. Thus, accesses specific to the additional module can be effected without the driver of the end device having to be configured therefor when the controller adapts or converts commands conforming to standard drivers to instructions specific to the additional module.

In a preferred embodiment the additional module is a security module realizing a security functionality. The activable security functionality here can comprise securing and/or protecting certain data in the data memory device. However, by means of the security module also other security-relevant processes can be executed, triggered and/or controlled.

BRIEF DESCRIPTION OF THE DRAWINGS

An embodiment of the invention will hereinafter be explained in more detail with reference to the drawings.

The figures are described as follows.

DETAILED DESCRIPTION OF VARIOUS EMBODIMENTS

Figure 1:
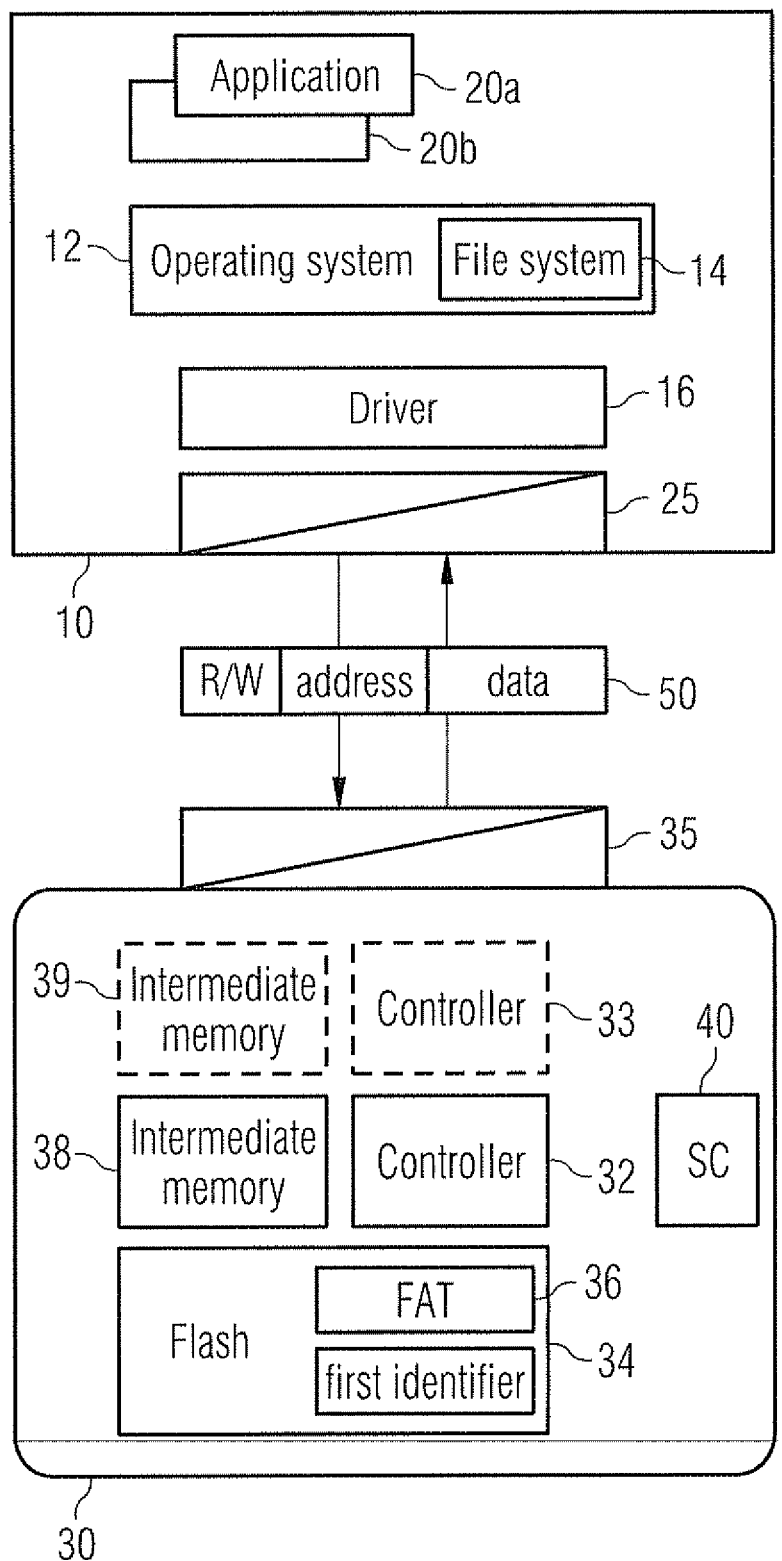
FIG. 1 a system consisting of an inventive memory data carrier and a terminal.

FIG. 1 shows a system consisting of a terminal 10 and a portable memory data carrier 30, both with their essential components.

"Terminal" in the following is understood as a computer-based device providing software- and hardware resources to a user in order to execute different data-processing tasks determined by applications 20a, 20b. Terminals can be electronic devices or end devices of any type having an interface for memory data carriers, such as for example a personal computer (PC), a host for a plurality of users, or in particular also a mobile end device, such as a cell phone or a PDA, a digital camera, a digital audio system or similar.

The terminal 10 is based on a conventional computer whose typical components, as far as not required for the description, are not represented. It has an operating system 12 for executing all basic terminal functions, a file system 14 allocated to the operating system 12, a driver 16 for controlling a data exchange with an external device, as well as an electromechanical interface 25 for establishing a physical data-exchange connection with an external device. The terminal serves to execute different applications 20a, 20b which are stored in the form of software in a memory of the terminal 10.

A portable "memory data carrier" in the following is understood in principle as a computer-based device accommodated in a portable, geometrically small housing, so that it can be comfortably carried along by a user, which has no man-machine interface or one that is configured merely in a reduced fashion, and provides a user with limited software- and hardware resources corresponding to its construction size, to be able to execute a limited set of data-processing tasks. Typical construction types for a portable memory data carrier are a smart card, a USB token, a multimedia card (MMC), a secure digital memory card (SD card) or a memory stick.

The portable memory data carrier 30 also has the basic structure of a conventional computer with the typical elements therefor, which, to the extent that this is unnecessary, are not explained in detail, but has no man-machine interface or one that is configured at most in a reduced fashion, for example in the form of a light-emitting diode. As a rule the memory data carrier 30 is implemented in a construction form which is geometrically so small that the small construction size limits performance and resources.

According to the invention the portable memory data carrier 30 has a main function and one or several additional functions. The main function consists in the capability to manage a memory element 34 using a transmission protocol adapted to the memory element 34. The main function determines the transmission protocol according to which the terminal 10 communicates with the portable memory data carrier 30. The implementation of the main function can be limited to the setup for executing the transmission protocol; the actual function, i.e. in particular a memory function, does not necessarily have to be actually implemented. The additional function can for example consist of a signature function or an authentication function. It is provided by an additional module 40 working independently of the main function. The additional module 40 here can be realized as a pure software component, as a hardware component or as a combination of both.

The main components of the portable memory data carrier 30, in the following referred to as "memory device" in view of its conventional main function, are a controller 32 for controlling the memory function and the data exchange with a terminal 10, an optional further controller 33 for special tasks, a memory system consisting of a re-writable memory element 34 for the non-volatile accommodation of data and an intermediate memory 38 allocated to the computer 32 and preferably realized in the form of a RAM for accommodating data temporarily, an additional module 40 for executing one or several additional functions, as well as a corresponding interface 35 which corresponds with the interface 25 of the terminal 10 for establishing a physical connection for exchanging data with a terminal 10.

Instead of one single additional module 40 the memory device 30 can also have several. These can interact permanently or for providing certain additional functions. In addition to the controller 32 furthermore optionally an auxiliary controller 33 can be provided, having an intermediate memory 39 of its own. The auxiliary controller 33 has the same structure as the controller 32 and typically executes certain special functions. The auxiliary controller 33 can in particular be connected upstream of the controller 32 and take over the communication with the additional module 40. In this constellation the management of the memory element 34 can take place through a conventional standard controller. Write-/read commands for the memory element 34 are then passed on from the terminal 10 via the auxiliary controller 33 to the controller 32 or from the controller 32 via the auxiliary controller 33 to the terminal 10. However, unless explained explicitly differently, in the following it is always assumed that only one controller 32 is given.

The management of the memory system of the data memory carrier 30 takes place using a memory allocation table 36 such as is known in particular as an FAT (file allocation table). Expediently the memory allocation table 36 is located in the memory element 34; but it can also be located in a different location in the memory system of the memory device 30 without any problem; among other things in the ROM, in which case it is immutable.

The interface 25, 35 typically is of the contact type, but it can also be configured as a contactlessly working interface. It can for example be a universal standard interface, such as a USB interface, or an interface adapted to a certain type of memory device 30, such as an interface for a multimedia card (MMC), a secure digital memory card (SD card) or a memory stick. To carry out a data exchange via the interface 25, 35 a suitable transmission protocol adapted to the memory element 34 is used, which as a rule differs clearly from a specific protocol suitable for communicating with an additional module 40.

The operating system 12 of the terminal 10 is an operating system that is widespread for computer-based end devices, such as Symbian, Windows, Linux or a Java platform. It executes one or several applications 20*a*, 20*b*, which are stored in the form of software in the terminal 10. The applications 20*a*, 20*b* realize use functions which can comprise accesses to the memory element 34 of a memory device 30. The applications 20*a*, 20*b* furthermore can provide accesses to the additional module 40 of a memory device 30. Upon their execution the applications 20*a*, 20*b* use system- or standard functions provided by the operating system 12, in order to access e. g. a file system 14 and, via said file system, files in a peripheral device, in particular a memory device 30. To complement the given standard functions an application 20*a*, 20*b* can provide special auxiliary functions for executing accesses to the additional module 40 for processing the data exchange generated within the framework of such accesses, such as e. g. specialized driver elements to complement a given driver.

The file system 14 works as a part of the operating system 12 and is directly allocated thereto, as indicated in FIG. 1. It manages the memory systems of the terminal 10 and the connected peripheral devices, in particular of a memory device 30. Accesses to the file system 14 take place by means of a logic file identifier using standardized access commands such as OPEN, WRITE or READ. A respective access command supplied by the operating system 12 is converted by the file system 14 by means of suitable drivers into a physical access to the memory system managed by the file system 14. Vis-à-vis the operating system 12 the file system 14 here manages also the memory allocation of the memory element 34 of the memory device 30. Accesses thereto take place with the same standardized access commands that are used for accesses to the terminal's internal memory system. To manage accesses to a memory element 34 of a memory device the file system 14 uses the memory allocation table 36, which is read by the file system 14 for this purpose.

To execute a logic access command to a memory element 34 that is transmitted by the operating system 12 the file system 14 uses a driver 16. This driver converts transparent access commands into commands that are interpretable for the controller 32 of the memory device 30. In principle the commands contain an address of the memory element 34, as well as a specification whether the command is a write- or read command. The data allocated to a command are transmitted in data blocks 50. The driver 16 is a standard driver adapted to the characteristics of the interface 25, 35 and the type of memory device 30. Expediently it is provided internally in the form of a hierarchically structured chain of drivers, in which specialized driver elements are arranged under a main driver, which are activated as needed. The specialized driver elements can be provided by the application 20*a*, 20*b* and be inserted in a given internal driver structure retrospectively, in order to complement it. The driver 16 is implemented for example as a conventional flash-card driver if the memory device 30 is of the flash-card type. A specialized driver element provided by an application can in particular serve to insert routing information in application data to be transmitted to the additional module 40. The driver 16 in the following is regarded as a part of the file system 14 and is referred to summarily only as file system 14.

The controller 32 of the memory device 30 converts the access commands coming in via the interface 35 into corresponding accesses to the memory element 34. For preparing the access commands in the terminal 10 it transmits the memory allocation table 36 to the file system 14. The controller 32 furthermore serves as a writing-/reading device vis-à-vis the additional module 40 and communicates with it via a specific protocol. By means of an evaluation unit set up for this purpose preferably in the form of a program it evaluates data blocks coming in via the interface 35 with regard to whether they are intended for the additional module 40. For this purpose in the memory system of the memory device 30 a unique first identifier is stored, by means of which the controller 32 evaluates incoming data blocks. If data blocks are intended for the additional module 40, the controller 32 routes the application data contained in the data blocks via a switching unit provided for this purpose either directly to the additional module 40 or, in the fashion of a reading-/writing device, first generates own data on the basis of the received application data and then routes these to the additional module 40 or, if the application data are commands for the controller in its function as reading-/writing device, such as the command GET STATUS, executes these. The controller 32 furthermore controls the data exchange in the reverse direction and transmits response data of the additional module 40 back to the terminal 10 or first stores them for such a time until the terminal 10 requests the response data. The intermediate memory 38 serves to collect commands transmitted in several data blocks. It furthermore serves to intermediately store responses from the additional module 40.

The controller 32 furthermore monitors the data exchange to the terminal 10 and with the additional module 40 for formal correctness and plausibility. For example it checks whether write- and read accesses to the additional module 40 are respectively executed in their entirety.

Expediently the controller 32 generally monitors the error-free function of the additional module 40 and signals errors or undefined states to the terminal 10. The signaling can take place in that the controller 32 regularly sends a valid signal to the operating system 12, the omission of which indicates to the operating system 12, if applicable, an undefined state or an error; or the controller 32 directly assesses the state of the additional module 40 and, if applicable, transmits error messages to the terminal 10.

The additional module 40 is configured typically in the fashion of a chip-card IC, i. e. it is particularly manipulation-proof logically and physically, limited in its resources and typically executes a security-critical function that is sensitive to attacks, such as generating a signature over sent data. Preferably the additional module 40 is a separate construction unit and has an independent controller. However, it is also conceivable to configure the additional module 40 as a functionally independent component of the controller 32 or together with the latter as a joint construction element. Accesses to the additional module 40 take place using a specific protocol realized by the controller 32.

Figure 2:
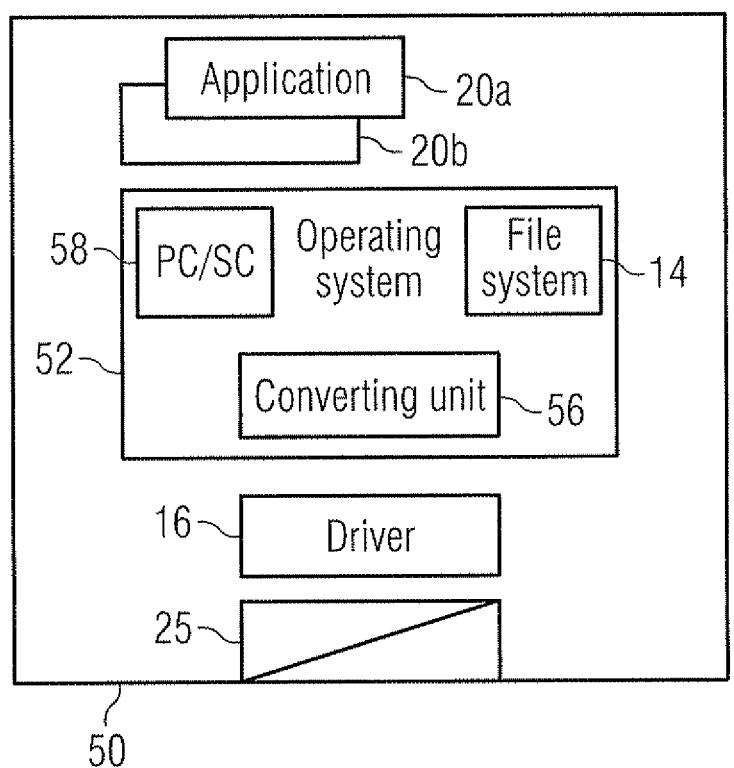
FIG. 2 an alternative embodiment of a terminal for a system according to FIG. 1, FIG. 3 a flow chart on the function of the system shown in FIG. 1 and FIG. 4 a flow chart on the function of a system working with a terminal according to FIG. 2, FIG. 5 a simplified flow chart on the simultaneous execution of two sessions.

FIG. 2 shows a variant of a terminal. In line with the above description, the terminal 50 shown in FIG. 2 has an operating system 12, a file system 14, one or several applications 20*a*, 20*b* to be executed, as well as an interface 25. In contrast to the terminal according to FIG. 1 the terminal 50 executes applications 20*a*, 20*b* which are not designed for an immediate data exchange with an additional module 40 or for an operating system 12 directly supporting the function of the additional module 40. In order to convert the data exchange from and to the terminal 50 to the format required for communication with an additional module 40, the operating system 12 of the terminal 50 has a logic interface 58 adapted to the function of the additional module 40, for example a standardized interface according to the PC/SC (personal computer/smart card) specification, which provides auxiliary functions, for example for authentication, for establishing the connection or for managing several additional modules 40, which converts the data exchange generated by the application 20*a*, 20*b* in the format of a standard computer into the ISO format predetermined for chip cards. The logic interface 58 enables the execution of terminal-independent applications 20*a*, 20*b*, which are not restricted to a certain operating system 12 or a certain additional module 40. To the logic interface 58 a converting unit 56 is allocated, which converts the data exchange occurring at the logic interface 58 to the transmission protocol adapted to the memory element 34. The converting unit 56 can in particular be a so-called IFD handler (interface-device handler) using the standard functions provided by the operating system 12 for the file system 14.

Figure 3:
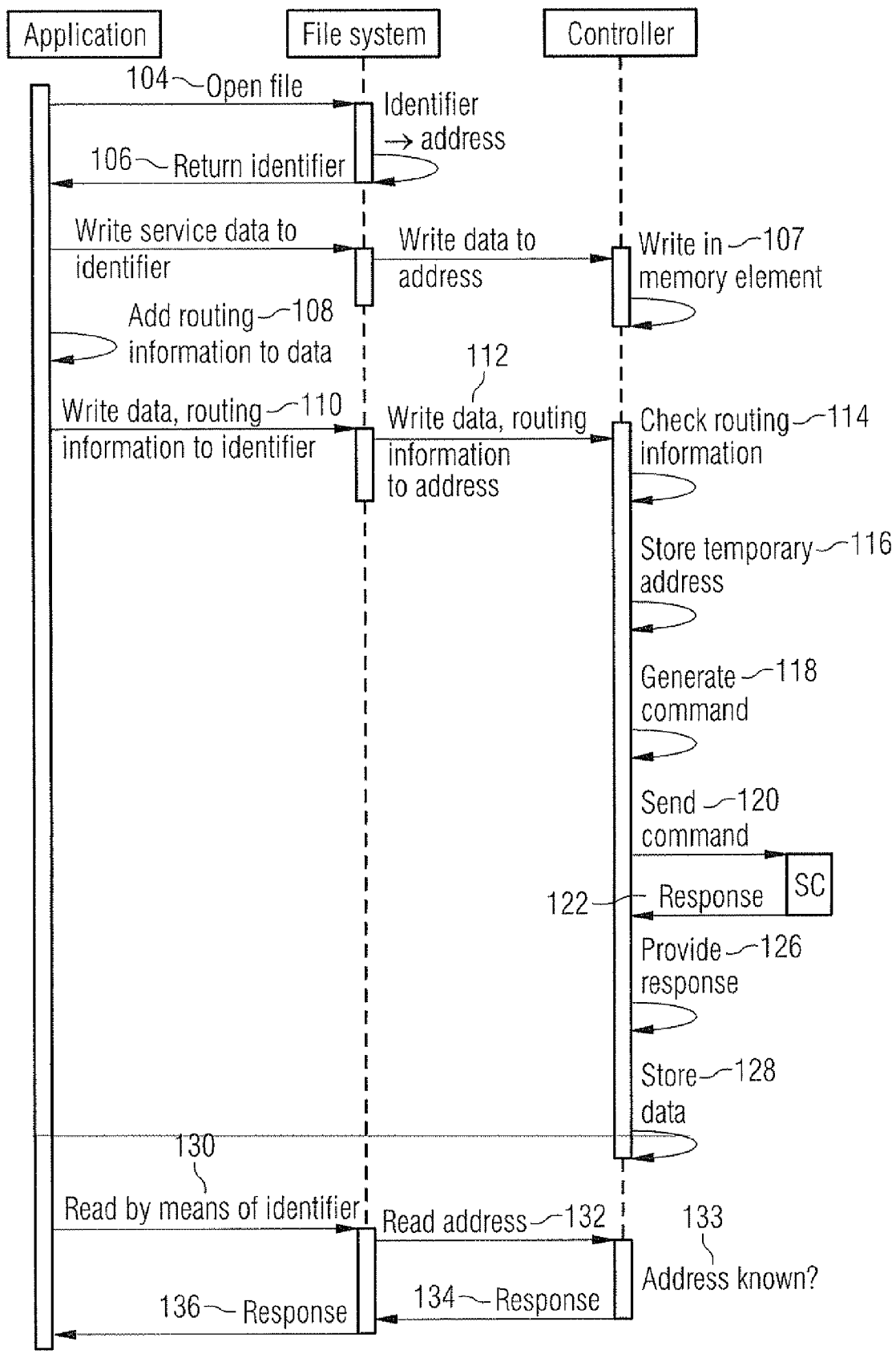

On the basis of the generated data flow FIG. 3 illustrates the interaction between a terminal 10 and a memory device 30 upon the execution of an application 20*a*, 20*b* including an access to the additional module 40.

The shown process starts at a point at which, within the framework of executing the application 20*a*, 20*b*, an access to the additional module 40 is to be executed. The access to the additional module 40 can be a write- or a read access or can also consist of triggering a certain function of the additional module 40, such as for example the transmission of result data of functions triggered earlier, or setting the additional module 40 to a certain state. As generally assumed in the following, the access can be effected by an application 20, but also e.g. by a driver or in any other fashion by the operating system 12 of the terminal 10. In the following it will be assumed by way of example that in a write access application data are to be transmitted to the additional module 40. The application data can for example be APDUs for a smart-card IC.

In order to execute the access to the additional module 40 the application 20*a*, 20*b* first prompts the file system 14 via the allocated driver, step 104, to open a file with an accompanying, unique file name on the data memory device 30. Subsequently the file system 14 sets up a space for the file in the available address space of the memory element 34 of the memory device 30 and returns a handle for subsequent accesses to the file to the application 20*a*, 20*b*, step 106. To carry out this step it uses the memory allocation table 36 requested beforehand from the memory device 30 for this purpose, entering the new file in said memory allocation table.

It can be provided that setting up files is allowed only in certain applications 20 and/or only for certain functions; in this case it is first checked whether the accessing application is authorized to access. It can furthermore be provided that accesses to certain files are allowed only for certain applications 20; this is also checked by the file system 14 prior to executing an access.

Subsequently it can be provided that the file system 14 via the controller 32 first executes a standard write access to the memory element 34 to the file set up before, and writes service data into the file, step 107. These service data can e. g. be error messages which are later returned to the operating system 14, if applicable, in case that during an access an error or an undefined state occurs, and the controller cannot deliver a response of the additional module 40 requested by the application. The step can also be executed at an earlier stage, in particular also before the program execution of the application 20 reaches the access to the additional module 40.

Then the application data to be transmitted within the framework of the access to the additional module 40 are prepared for the transmission, step 108. On the one hand, in doing so the application data are adapted to the transmission protocol that is used for the transmission via the interface 25, 35 and is adapted to the memory element 34. It transports data to be transmitted in data blocks of a defined size. In case that the amount of application data to be transmitted is greater than the size of a data block in the underlying transmission protocol, the application data to be transmitted are divided into several partial data blocks corresponding to the block size predetermined by the transmission protocol.

Furthermore special routing information is generated for the application data. Said routing information contains a unique identifier, as well as a specification of the sender and the destination unit of the application data. The identifier is a character string of a preferably firmly predetermined size of for example 8 or 16 bytes. It is preferably allocated to one additional module 40. The identifier can be recognized by the controller 32. For this purpose it is preferably available to the controller 32 in an identical fashion. In so doing it was either transmitted in advance at an earlier time during the session or is statically stored as a first identifier in the memory device 30 and is permanently available to the controller 32. Preferably at least one first identifier is allocated in the same fashion to a certain type of memory device 30 and is stored in their respective memory system. Although in the following, to facilitate the description, it is always assumed that the identifiers in the routing information and the controller are symmetrical and identically matching each other, the identifier used in the routing information and the identifier available to the controller 32 can also be constructed in the fashion of an asymmetrical pair of keys. In this case they do not match each other, but their consistency has to be established by means of applying a mathematical operation.

Expediently it is provided that during a data exchange between a terminal 10 and a memory device 30 at least one or several further identifiers are generated dynamically. The dynamic generation expediently takes place on the basis of executing cryptographic operations, such as generating random numbers or generating a signature over application data. A first further identifier is expediently generated regularly dynamically, as soon as the controller 32 has established that a first identifier is present. The dynamic generation of further identifiers is for example triggered by means of allocation commands supplied for this purpose. The additional identifiers can be generated by the controller 32, which subsequently communicates them to the operating system 12. Alternatively the operating system 12 can supply an additional identifier or the operating system 12 and the controller 32 can respectively supply parts of an additional identifier. It can furthermore be provided to change the first identifier firmly allocated to a type of memory devices 30 at greater intervals.

Additionally in the routing information or in the identifier expediently a specification of the sender and/or the destination unit is coded. This can for example take place in a byte in that for example the value "0" stands for a data transmission from a terminal 10 to a controller 32, "1" for a data transmission from a terminal 10 to an additional module 40, "2" for a data transmission from a controller 32 to a terminal 10 and "3" for a data transmission from an additional module 40 to a terminal 10. In the routing information further additional information can be contained, such as counters for securing accesses or for declaring application data as parameters.

The routing information is connected with the application data to be transmitted, forming a data stream which is embedded in a data block. In case that the application data have to be divided into partial data blocks, each partial data block is connected with routing information to form a data stream. The resulting data streams are respectively embedded in a data block according to the transmission protocol. Finally the application data are present embedded in one or several data blocks according to the transmission protocol adapted to the memory element 34.

The data blocks are subsequently transferred to the file system 14 together with the identifier as a write command, step 110. Said file system converts the write command into a write command executable for the controller 32 of the memory device 30. For this purpose it determines the address belonging to the identifier in the memory system of the memory device 30. The converted data and the address are transmitted to the controller 32 via the driver 16 together with the specification that the command is a write command, step 112.

The controller 32 checks all or certain received data blocks for whether they contain routing information, step 114. For this purpose the controller 32 checks whether the data block contains an identifier known to the controller 32. Accordingly, if a data block does not contain any routing information, the controller 32 interprets it as a standard access to the memory element 34 and executes it correspondingly at the transmitted address.

In contrast, if a data block contains routing information, i. e. if the data block e. g. contains a first identifier also stored in the memory device 30, the controller 32 stores the address transmitted together with the data block as a temporary working address in the intermediate memory 38 for further use, step 116.

Expediently, after recognizing a first identifier, the controller 32 immediately, dynamically generates a further identifier and communicates the same to the application 20a, 20b and/or the operating system 12. The further identifier is used subsequently for the further data exchange until the conclusion of the same.

The controller 32 now processes the received data block in order to route the application data contained therein to the additional module 40 or, in case that the data represent commands to the controller 32 in its function as a writing-/reading device, to execute these. For this purpose it removes the routing information from each data block, checks whether the data present subsequently already constitute complete application data, if this is not the case, first collects the data remaining after removing the routing information in an intermediate memory until the application data are present in their entirety, and then, if the application data are intended directly for the additional module 40, generates a command, step 118, which is executable by the additional module 40. In case that the application data constitute a command, for example the command RESET, which is directed directly at the controller 32 in its function as a writing-/reading device for the additional module 40, the controller 32 executes it. Before generating the command for the additional module 40 the application data are expediently submitted to a security check, in which for example plausibility and consistency are verified. It is checked for example whether the additional module 40 is already activated.

In an expedient variant for evaluating the routing information it can be provided that the controller 32 interprets the identifier itself as a command and executes it subsequently. Preferably in this case a set of several first identifiers is provided, which respectively correspond to a different command or prompt a different action of the controller 32.

The data transmitted with one or several data blocks can contain additional data, such as parameters for adjusting the data exchange between the terminal 10 and the controller 32 or between the controller 32 and the additional module 40, which are not intended for direct passing on to the additional module 40. The additional data are expediently distinguished from other application data by means of corresponding information in the routing information. The additional data are stored by the controller 32 in the memory element 34 within the framework of a standard access.

It can be provided that the controller 32 embeds further data into a command generated from received data, which it reads out e. g. from a defined address in the memory element 34. The data can in particular be application data, function calls, parameter information, settings or results of previous calls of functions of the additional module 40. They were stored at an earlier time at the defined address by an application 20 or a function of the operating system 12 via the terminal 10 or by the additional module 40.

The controller 32 sends the command, which is possibly complemented by further data, to the additional module 40, step 120. The latter executes the command and generates a response which it returns to the controller 32, step 122.

The response is converted by the controller 32 into a form that is suitable for being returned to the terminal 10, step 126. Herein in particular it can again be provided to divide the response into several partial data blocks, if the size of the response exceeds the size of the data block admissible within the framework of the transmission protocol. The controller 32 provides the response with the stored temporary address and stores it in the intermediate memory 38, step 128. Alternatively it can also be provided that the response is stored at certain addresses in the memory element 34 that are reserved for this purpose.

In order to obtain a response to application data sent before—in step 110—the operating system 12, expediently using the identifier, sends to the file system 14 regular read accesses to the temporary working address in the memory element 34 of the memory device 30, step 130. The read accesses are converted by the file system 14 and routed to the controller 32 of the memory device 30, step 132. The latter checks whether the address stated in the read access is a temporary address, step 133, and whether a corresponding response is provided in the intermediate memory 38. If this is the case the controller 32 sends the response from the additional module 40 located in the intermediate memory 38 to the file system 14, which passes it on to the operating system 12, and thereby to the executed application 20a, step 136. Subsequently the controller 32 deletes the intermediately stored temporary working address.

If in the course of an access an error is caused by the loss of the temporary address, the controller 32 establishes upon checking the address in step 133 that no temporary address corresponding thereto exists. It then interprets the read access as a standard access to the memory element 34, executes it correspondingly to the temporary address and reads out the service data stored there beforehand—in step 107. It returns these to the operating system 12.

Figure 4:
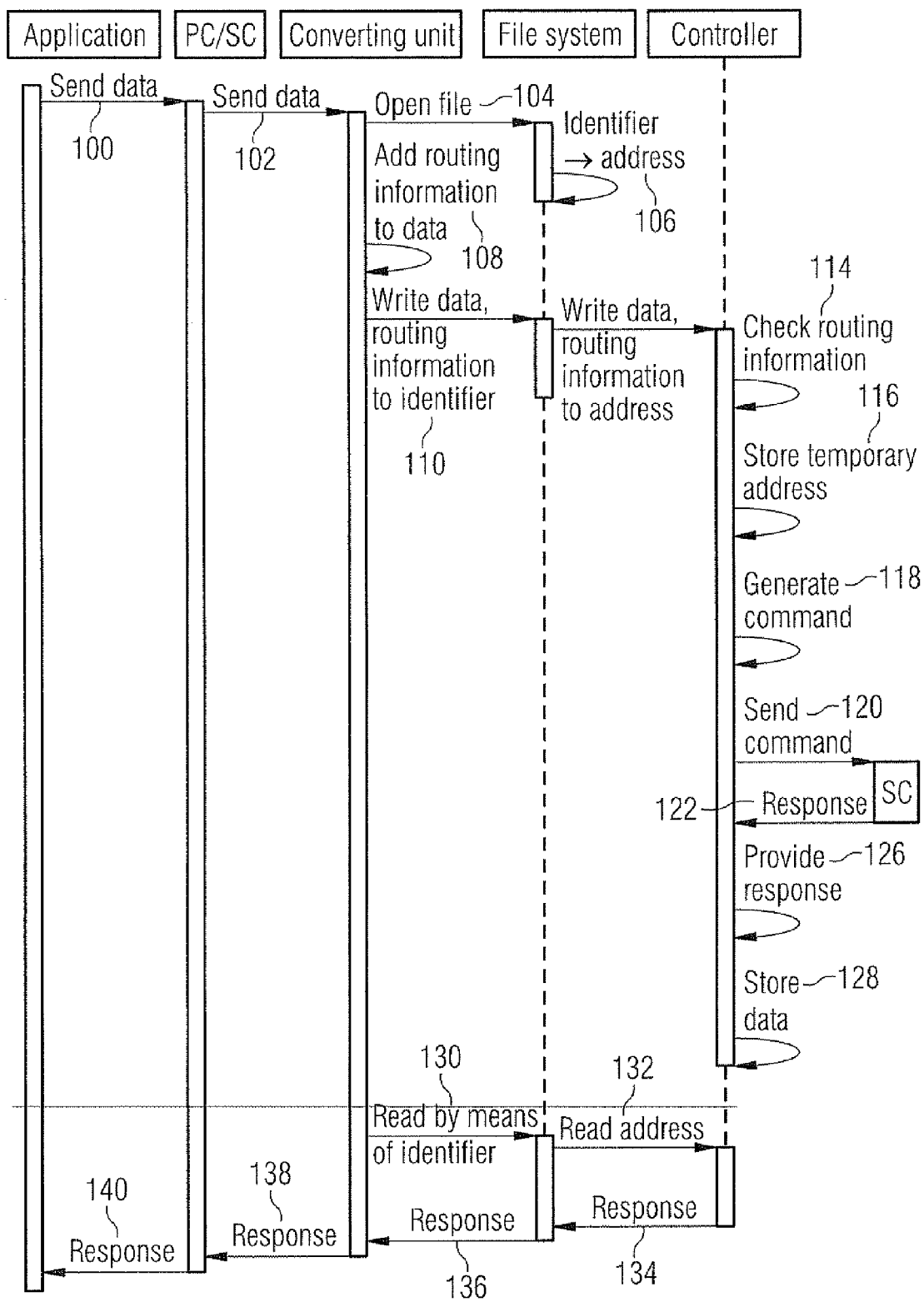

FIG. 4 shows a process to illustrate the interaction between a memory device 30 and an alternative terminal 50 according to FIG. 2. The executed application 20a, 20b itself now is not adapted to generating accesses to the file system 14. Rather, it communicates via an interface 58 that is specially adapted to communicating with the additional module 40 and is independent of the file system 14. The interface 58 embeds the application data in a protocol for transmission to the additional module 40 and thus sends them to the converting unit 56, step 102.

The converting unit 56 generates access commands to the file system 14 from the application data received from the interface 58. For this purpose it executes step 104 and prompts the file system 14 to return an identifier to a memory space provided in the memory element 34, step 106. Furthermore the converting unit 56 prepares the application data received from the interface 58 for transmission to the memory device 30. For this purpose it divides the application data again into several partial data blocks, if applicable. Furthermore it generates routing information for the application data. The converting unit 56 combines the application data and the routing information to form a data stream, step 108, which can be embedded in a data block of the transmission protocol adapted to the memory element 34. In case that the application data had to be separated into partial data blocks, it provides each partial data block with routing information. The converting unit 56 transmits the data stream or the data streams given afterwards together with the identifier to the file system 14, step 110, which routes them to the controller 32 via the driver 16 after determining the address associated with the identifier, step 112. The controller 32 subsequently executes the steps 114 to 128 as described.

To obtain a response the converting unit 56 expediently regularly sends a read access signal to the file system 14, which converts the read access command and routes it to the controller 32, step 132. The controller 32 checks whether a response is available at the address delivered with the read command and, if applicable, transmits this response, step 134, back to the file system 14, which, after conversion, routes it to the converting unit 56, step 136.

The converting unit 56 prepares the response for the interface 58 and sends it to the latter. From the interface 58 the response is finally, step 140, returned to the application 20a.

In a variant of the procedure described above with reference to FIGS. 3 and 4 for transferring the application data intended for the additional module 40 to the file system 14 routing information is not assigned to all partial data blocks derived from the application data, but only the respectively first. After recognizing routing information in step 114 the controller 32 then switches to a safe mode until the last partial data block of a set of application data has been received.

It can furthermore be provided that routing information is assigned also to responses sent back by the memory device 30 to the terminal 10. Thereby e. g. error search can be supported. The routing information here can be configured differently to that used when sending data to the memory device 30. For example a signature can be omitted.

The concept of the routing information allows to manage several data exchanges between a terminal 10 and a memory device 30 taking place simultaneously in independent sessions, in that the terminal 10 starts a separate, further data exchange to a further instance of the memory device 30 in addition to an already running data exchange, using further routing information. The second instance here can be an individual additional module 40 conducting separate data exchanges with two applications 20a, 20b on a terminal 10, or one or several further additional modules 40 located on a memory device 30 that run separate data exchanges with one or several applications 20 on a terminal 10; furthermore the further instance can also be a further controller 33, which is for example connected upstream of the controller 32 and for example serves to execute certain additional tasks such as protocol conversions or encryptions.

The principle of running several sessions is illustrated in FIG. 5. In the example two applications 20a, 20b access an additional module 40 independently from each other. The process shown in FIG. 5 uses the same steps as shown in FIG. 3; however, for reasons of clarity they are represented only in part. The two sessions are distinguished by the controller 32 by means of their respective routing information. A first session here is started by the application 20a using the first identifier that is firmly stored in the memory device 30 and has a piece of routing information I, step 150. With the routing information I the controller 32 dynamically requests the generation of a further identifier, step 151, 152, 154. By means of the subsequently generated identifier the routing information II is generated, which is used by the application 20a in the further process, step 110, 112, 116.

Subsequently a further session of the application 20b is started in that by means of a corresponding command, which is again preceded by the routing information I, step 160, the controller 32 is dynamically requested to generate a further identifier, step 161. The controller 32 subsequently generates a further identifier, step 162, and communicates it to the application 20b in that the same reads it out, step 164. From the read-out identifier the application 20b generates a further piece of routing information III, which it adds to the application data, step 109. After transmitting the routing information III in a data block to the controller 32, step 113, the latter stores the corresponding address as a further temporary address II in the intermediate memory, step 117. Subsequently the controller 32 allocates all data blocks with the routing information II to the first session and all data blocks with the routing information III to the second session. Every session here represents a separate logic channel between an application 20a, 20b and the additional module 40. Analogously further sessions can be started. The routing information I using the firmly stored first identifier is assigned to commands concerning the controller 32 in its function as a reading-/writing device.

It can be provided to divide the accesses to the additional module 40 into categories and to run each category in a separate session. For example a distinction can be made between management functions and application functions. In the case of an error in a session a different session can then be used in order to e.g. reset a faulty application. Analogously, separate sessions can be run simultaneously between an application 20 executed on a terminal 10 and several additional modules 40 configured on the same memory device 30.

Without leaving the scope of the invention, the methods and objects described above can be varied in many ways. Thus the terminal 10, 50 can be part of a superordinate device or can be configured so that it is split among several devices. Further intermediate steps can be integrated in the processes according to the FIGS. 3 and 4, which steps serve for example to secure execution. On the other hand, certain steps can also be omitted without having a substantially interfering effect on the overall function; this is valid e. g. for storing service data in advance in step 107 and possibly returning them in the case of an error.

The invention claimed is:

1. A method for accessing a portable memory data carrier, having a controller for managing a standardized memory element and an additional module, comprising the following steps:
   generating application data intended for the additional module and containing an access thereto,
   generating routing information containing an identifier which can be recognized by the controller,
   combining the routing information and the application data to form a data stream,
   embedding the data stream in at least one data block according to a transmission protocol provided for accessing the memory element,
   transmitting the at least one data block to the memory data carrier in the transmission protocol adapted to the memory element,
   determining by the controller whether a data block received by the portable memory data carrier contains routing information, wherein the presence of routing information in the data block indicates that the data in the data block are intended for the additional module and the absence of routing information in the data block indicates that the data in the data block are intended for the memory element, and
   routing the application data contained in the data block to the additional module by the controller when the data block contains routing information,
   wherein application data to be transmitted are assigned a temporary working address in the memory data carrier and a response from the additional module to a command based on the application data is subsequently stored at the temporary working address.

2. The method according to claim 1, wherein the application data intended for the additional module are divided into partial data blocks and are transmitted in several data streams in several data blocks.

3. The method according to claim 1, wherein the identifier is a character string with a defined number of characters.

4. The method according to claim 1, wherein the identifier is allocated identically to a group of memory data carriers as a first identifier and is stored in their respective memory system.

5. The method according to claim 1, wherein for each additional module present on a memory data carrier a respective first identifier is stored.

6. The method according to claim 1, wherein an identifier is generated dynamically during a data exchange between a terminal and a memory data carrier.

7. The method according to claim 6, wherein a dynamically generated identifier is used for the duration of a data exchange for tagging application data intended for the additional module.

8. The method according to claim 1, wherein an additional identifier is generated in order to start, in addition to an already running data exchange, a separate further data exchange between a terminal and a memory data carrier.

9. The method according to claim 1, wherein the routing information contains a specification of sender and destination unit of the application data.

10. The method according to claim 2, wherein routing information is assigned only to the first partial data block.

11. The method according to claim 5, wherein the memory data carrier is switched to a safe mode upon recognizing routing information.

12. The method according to claim 1, wherein after the transmission of application data it is checked whether at the temporary address a response from the additional module is present.

13. The method according to claim 1, wherein at the temporary address service data are stored in the memory element which are output if in a subsequent check of whether a response is present the transmitted temporary address cannot be recognized.

14. The method according to claim 1, wherein in the controller a software is provided that permits analyzing data blocks for whether routing information is present.

15. The method according to claim 1, wherein the transmission of the application data takes place via a driver designed for exchanging data between a terminal and a memory element.

16. The method according to claim 15, wherein in the driver a special driver element provided by an application is integrated, which integrates routing information in a data block to be transmitted.

17. The method according to claim 1, wherein the routing of application data comprises a processing and/or converting of the application data into instructions to the additional module.

18. The method according to claim 17, wherein application data contained in the data block are routed by a checking controller to a different controller, if the data block contains routing information stored in the checking controller.

19. The method according to claim 1, wherein a key is provided by the additional module for encrypting and/or decrypting data stored in the memory element.

20. The method according to claim 1, including the following further steps:
   defining reserved addresses in the memory element as additional function addresses in a configuration phase executed in advance,
   comparing the address that was transmitted with the data block received by the portable memory data carrier with the additional function addresses,
   routing the application data contained in the data block to the additional module if the address matches an additional function address.

21. A portable memory data carrier comprising:
   at least one additional module and a controller configured to control an access to a memory element which can be accessed by means of data blocks according to a transmission protocol of the memory element, wherein the controller comprises an evaluation unit configured to evaluate incoming data blocks for whether routing information is present, wherein the presence of routing information in a data block indicates that the data in the data block are intended for the at least one additional module and the absence of routing information in the data block indicates that the data in the data block are intended for the memory element, wherein the controller routes data to at least one additional module if it has established that the data block contains routing information, wherein the controller is arranged so that upon recognizing routing information, the controller generates a temporary address and subsequently stores responses from the additional module to a command based on the application data at the temporary address.

22. The portable memory data carrier according to claim 21, wherein the controller comprises a switching unit configured to process the access to the memory element and converting it into instructions to the additional module.

23. The portable memory data carrier according to claim 21, wherein in the memory element a first identifier is stored as a reference for evaluating routing information.

24. The portable memory data carrier according to claim 21, wherein the additional module comprises a separate controller.

25. The portable memory data carrier according to claim 21, wherein the additional module is a security module having a security functionality activated by an access routed by the evaluation unit.

26. The portable memory data carrier according to claim 21, wherein the additional module comprises an IC of the smart-card type.

27. The portable memory data carrier according to claim 21, wherein the memory element is a non-volatile memory.

28. The portable memory data carrier according to claim 21, including an auxiliary controller that executes certain functions.

29. The portable memory data carrier according to claim 21, wherein the controller and the auxiliary controller are arranged in the form of a cascade, wherein the auxiliary controller is connected between an interface of the memory data carrier and the controller.

30. The portable memory data carrier according to claim 21, wherein the auxiliary controller conducts the data exchange with the additional module.

31. A method of using a portable memory data carrier, the portable data carrier comprising at least one additional module and a controller for controlling an access to a memory element which can be accessed by means of data blocks according to a transmission protocol of the memory element, wherein the controller comprises an evaluation unit configured to evaluate incoming data blocks for whether routing information is present, the method of using the portable memory data carrier, comprising the following steps:

generating application data intended for the additional module and containing an access thereto, generating routing information containing an identifier which can be recognized by the controller, combining the routing information and the application data to form a data stream, embedding the data stream in at least one data block according to a transmission protocol provided for accessing the memory element, transmitting the at least one data block to the memory data carrier in the transmission protocol adapted to the memory element, the evaluation unit of the controller determining whether a data block received by the portable memory data carrier contains routing information, wherein the presence of routing information in the data block indicates that the data in the data block are intended for the additional module and the absence of routing information in the data block indicates that the data in the data block are intended for the memory element, and the controller routing the application data contained in the data block to the additional module when the data block contains routing information, wherein application data to be transmitted are assigned a temporary working address in the memory data carrier and a response from the additional module to a command based on the application data is subsequently stored at the temporary working address.

32. A terminal comprising:

a processor and a memory containing instructions when executed by the processor causing the terminal to access, via a standard interface, a portable memory data carrier comprising an additional module and a controller for controlling access to a memory element which can be accessed by means of data blocks according to a transmission protocol of the memory element, generate application data intended for the additional module and containing an access thereto, generate routing information containing an identifier which can be recognized by the controller, combine the routing information and the application data to form a data stream, embed the data stream in at least one data block according to a transmission protocol provided for accessing the memory element, transmit the at least one data block to the memory data carrier in the transmission protocol adapted to the memory element, determine, by the controller, whether a data block received by the portable memory data carrier contains routing information, wherein the presence of routing information in the data block indicates that the data in the data block are intended for the additional module and the absence of routing information in the data block indicates that the data in the data block are intended for the memory element, and routing, by the controller, the application data contained in the data block to the additional module by the controller when the data block contains routing information, wherein application data to be transmitted are assigned a temporary working address in the memory data carrier at which and a response from the additional module to a command based on the application data is subsequently stored at the temporary working address is subsequently provided.

33. The terminal according to claim 32, wherein the standard interface is a writing- and/or reading device for SD memory cards, multimedia cards, compact flash cards and/or for USB memory sticks.

34. The terminal according to claim 32, wherein the standard interface is a MMC, SD or PC/SC interface.

35. A method of using a terminal configured to generate routing information for application data intended for the additional module, wherein the terminal accesses, via a standard interface, a portable memory data carrier comprising at least one additional module and a controller for controlling an access to a memory element which can be accessed by means of data blocks according to a transmission protocol of the memory element, the method of using the terminal, comprising the following steps:

the terminal generating application data intended for the additional module and containing an access thereto, the terminal generating routing information containing an identifier which can be recognized by the controller, the terminal combining the routing information and the application data to form a data stream, the terminal embedding the data stream in at least one data block according to a transmission protocol provided for accessing the memory element, the terminal transmitting the at least one data block to the memory data carrier in the transmission protocol adapted to the memory element, determining by the controller whether a data block received by the portable memory data carrier contains routing information, wherein the presence of routing information in the data block indicates that the data in the data block are intended for the additional module and the absence of routing information in the data block indicates that the data in the data block are intended for the memory element, and routing the application data contained in the data block to the additional module by the controller when the data block contains routing information, wherein application data to be transmitted are assigned a temporary working address in the memory data carrier at which and a response from the additional module to a command based on the application data is subsequently stored at the temporary working address is subsequently provided.

36. A system comprising portable memory data carrier as recited in claim 21 and a terminal configured to generate routing information for application data intended for the additional module, wherein the terminal accesses the portable memory data carrier via a standard interface.

37. A computer program product for accessing a memory data carrier with an additional module which can be loaded directly into a memory system of a terminal and comprises a memory storing software code portions by means of which the method steps as recited in claim 1 are executed when the software code portions are executed on a processor of the terminal.

38. The method according to claim 1, wherein the temporary working address is an address in the memory element.

39. The portable memory data carrier according to claim 21, wherein the temporary working address is an address in the memory element.

* * * * *